United States Patent [19]
Naraoka et al.

[11] Patent Number: 5,321,549
[45] Date of Patent: Jun. 14, 1994

[54] CLEANING APPARATUS FOR AN OBJECT LENS

[75] Inventors: Koji Naraoka, Sayama; Masayuki Suzuki, Tokorozawa, both of Japan

[73] Assignee: TEAC Corporation, Tokyo, Japan

[21] Appl. No.: 71,671

[22] Filed: Jun. 2, 1993

[30] Foreign Application Priority Data

Jun. 4, 1992 [JP] Japan ............................. 4-037865[U]

[51] Int. Cl.⁵ ............................................. G02B 7/00
[52] U.S. Cl. ................................................... 359/507
[58] Field of Search ......................................... 359/507

[56] References Cited

U.S. PATENT DOCUMENTS

| | | | |
|---|---|---|---|
| 4,165,179 | 8/1979 | Sato | 359/507 X |
| 4,991,949 | 2/1991 | Moorehead | 359/507 X |
| 5,109,368 | 4/1992 | Ohta et al. | 369/44.22 X |
| 5,148,312 | 9/1992 | Kawai et al. | 359/507 |
| 5,208,794 | 5/1993 | Mashiro | 369/44.27 |

*Primary Examiner*—Eugene R. LaRoche
*Assistant Examiner*—Do Hyun Yoo
*Attorney, Agent, or Firm*—Michael N. Meller

[57] ABSTRACT

A cleaning apparatus for an object lens which can provide a sufficient cleaning effect without affecting the supporting mechanism of an objective lens. The cleaning apparatus is inserted into a disk loading portion and cleans the object lens incorporated in an optical disk apparatus. The cleaning apparatus has a housing having approximately the same shape as the cartridge type optical disk. A brush protrudes from the housing and slide on the object lens when the cleaning apparatus in inserted into the optical disk apparatus. A sliding direction of the brush is set to be a predetermined direction between the inserting direction of the cleaning apparatus and a direction perpendicular to the inserting direction. Only components of force due to the sliding of the brush against the object lens, which components of force are smaller than the sliding force, are exerted to the object lens in a movable direction of the object lens for tracking adjustment and a direction perpendicular to the movable direction.

11 Claims, 5 Drawing Sheets

CLEANING APPARATUS FOR AN OBJECT LENS

BACKGROUND OF THE INVENTION

The present invention relates to a cleaning apparatus for an object lens, and more particularly to a cleaning apparatus for an object lens used for gathering a laser beam in an optical disk apparatus.

Generally, in an optical disk apparatus, a laser beam is irradiated onto a surface of a disk through an object lens so that the laser beam is gathered into a spot having a diameter of approximately 1 $\mu$m, and information is reproduced by utilizing a reflection of the laser beam. A laser beam reflected by the disk is incident upon an optical processing system through the object lens. In such a system, when dust is accumulated or adhesive material is attached to the object lens, an amount of beam transmitted in the object lens is decreased. Additionally, a beam spot on a focus point may be distorted or blurred. As a result, a laser is not focused, and thus a tracking servo system may not function normally. This causes an occurrence of a problem in that errors frequently occur in a reproducing operation.

In order to eliminate the above-mentioned problem, eliminating the dirt on the object lens is effective. However, it is difficult for a user to disassemble an optical disk apparatus to clean off an object lens. Cleaning apparatuses are supplied for cleaning off a surface of an object lens by inserting them into a disk loading part in the same manner as an usual optical disk.

Figure 1A:
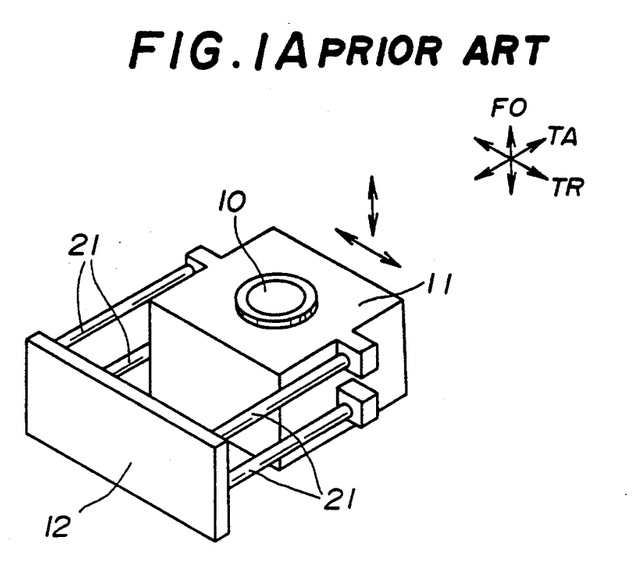
FIG. 1A is a perspective view of a wire suspension type supporting mechanism for an object lens.
Figure 1B:
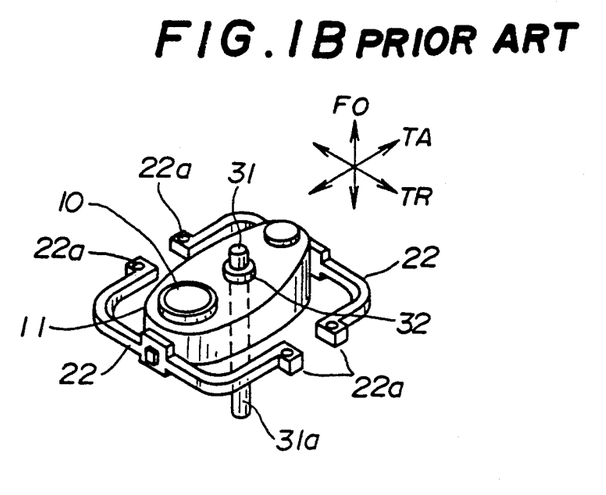
FIG. 1B is a perspective view of a shaft sliding type supporting mechanism for an object lens.

A description will now be given of conventional supporting mechanisms of an object lens. FIG. 1A shows a wire suspension type supporting mechanism, and FIG. 1B shows a shaft sliding type supporting mechanism. In FIGS. 1A and 1B, a focusing direction, that is, a direction of a rotational axis of an optical disk loaded in an optical disk apparatus is indicated by an arrow FO, a tracking direction, that is, a radial direction of the optical disk is indicated by an arrow TR, and a tangential direction of the optical disk is indicated by an arrow TA. It is understood that the focusing direction is perpendicular to a surface of the optical disk. The tracking direction is perpendicular to the surface of the optical disk. The tangential direction is tangential to a track formed on the optical disk. The focusing direction FO is perpendicular to both the tracking direction TR and the tangential direction TA.

In the supporting mechanism shown in FIG. 1A, a holder 11 provided with an object lens 10 is attached to a base 12 fixed on a portion of a head carriage (not shown in the figure) via four suspension wires 21. The suspension wire enables the holder 11 to be elastically supported in the tracking direction TR and the focusing direction FO. Additionally, the holder 11 is driven by an actuator including coils and magnets, and is movable in the tracking direction TR and the focusing direction FO.

In the supporting mechanism shown in FIG. 1B, a holder 11 provided with an object lens 10 is elastically supported by two elastic members 22. A shaft 31 extended in the focusing direction FO penetrates through the center of the holder 11. A bearing 32 is provided on the holder 11 to slide along the shaft 31. Either end 22a of each of the elastic members 22 and one end of the shaft 31 are fixed to a head carriage (not shown in the figure). The holder 11 is driven by an actuator (not shown in the figure) similarly to the mechanism shown in FIG. 1A so as to be movable in the focusing direction and a rotational direction with respect to the shaft 31.

It should be noted that the focusing of the object lens 10 onto a surface of an optical disk is performed by the movement of the holder 11 in the focusing direction FO, and a laser spot is accurately positioned on a track formed on the optical disk by the movement of the holder 11 in the tracking direction TR or the rotational direction with respect to the shaft 31.

A description will now be given of a conventional cleaning method for an object lens. The conventional cleaning apparatus cleans off dust accumulated on a surface of an object lens by means of a brush (or a pad). That is, the brush makes contact with a surface of an object lens and is slid on the surface of the object lens.

In either type of the above-mentioned supporting mechanism for an object lens, the holder 11 provided with the object lens is movable in the tracking direction TR. Accordingly, if a sliding direction of a brush corresponds to the tracking direction, which is a movable direction by an actuator, the object lens is moved by a sliding force exerted by the brush, and thus there is a problem in that an effective cleaning cannot be performed.

Additionally, if the sliding direction of the brush corresponds to the tangential direction TA which is perpendicular to the tracking direction TR in the supporting mechanism shown in FIG. 1A, an excessive load is applied to the wires 21 in a longitudinal direction thereof. In such a case, there is a possibility that a deformation of the wires 21 or an exfoliation of adhesion applied for fixing the wires 21 occurs. Additionally, in the case the supporting mechanism shown in FIG. 1B is used, dust on the surface of the object lens flies in a direction where the shaft 31 is located and the dust is trapped in a space between the shaft 31 and the bearing 32; results in rough slide or rotation of the holder 11 and thus there is a problem that a stable control of the movement of the holder 11 is not achieved.

SUMMARY OF THE INVENTION

It is a general object of the present invention to provide a novel and useful cleaning apparatus for an object lens in which the above-mentioned problems are eliminated.

A more specific object of the present invention is to provide a cleaning apparatus for an object lens which can provide a sufficient cleaning effect without affecting the supporting mechanism of an objective lens.

Another object of the present invention is to provide a cleaning apparatus for an object lens which can eliminate a bad effect on an actuator which drives the object lens.

In order to achieve the above-mentioned object, a cleaning apparatus for an object lens incorporated in an optical disk apparatus which is used with a cartridge type optical disk, the cleaning apparatus performing a cleaning operation while inserted into a disk loading portion of the optical disk apparatus, according to the present invention comprises:

a housing having approximately the same shape as the cartridge type optical disk, the housing having a surface parallel to a recording surface of the optical disk when the optical disk is loaded to the disk loading portion of the optical disk apparatus, the surface facing to the object lens when the cleaning apparatus is inserted into the optical disk apparatus;

cleaning unit, provided in the housing, for cleaning the object lens, the cleaning unit protrudes from the first surface during operation when the cleaning apparatus is inserted into the optical disk apparatus, the cleaning operation being performed by the cleaning unit making contact with the object lens and sliding on the object lens; and driving unit, provided in said housing, for driving the cleaning unit so that a sliding direction of said cleaning unit becomes a predetermined direction between an inserting direction of the cleaning apparatus into the optical disk apparatus and a direction perpendicular to the inserting direction, the inserting direction and the direction perpendicular to the inserting direction being parallel to the surface of said housing.

According to the present invention, the sliding direction of the cleaning unit with respect to the object lens corresponds to neither the tracking adjusting direction nor the direction perpendicular to the tracking adjusting direction. Accordingly, component forces of the sliding force which are smaller than the sliding force applied by the cleaning unit are respectively exerted in the tracking direction and the direction perpendicular to the tracking direction. Thus the undesired movement of the object lens caused by the sliding force of the cleaning means is decreased, resulting an improvement of the cleaning effect for the object lens.

Additionally, damage to the supporting mechanism or an actuator which is provided for moving slightly the object lens caused by the sliding force applied by the cleaning unit is prevented.

Other objects, features, and advantages of the present invention will become more apparent from the following detailed description when read in conjunction with the accompanying drawings.

DETAILED DESCRIPTION OF THE PREFERRED EMBODIMENT

Figure 2:
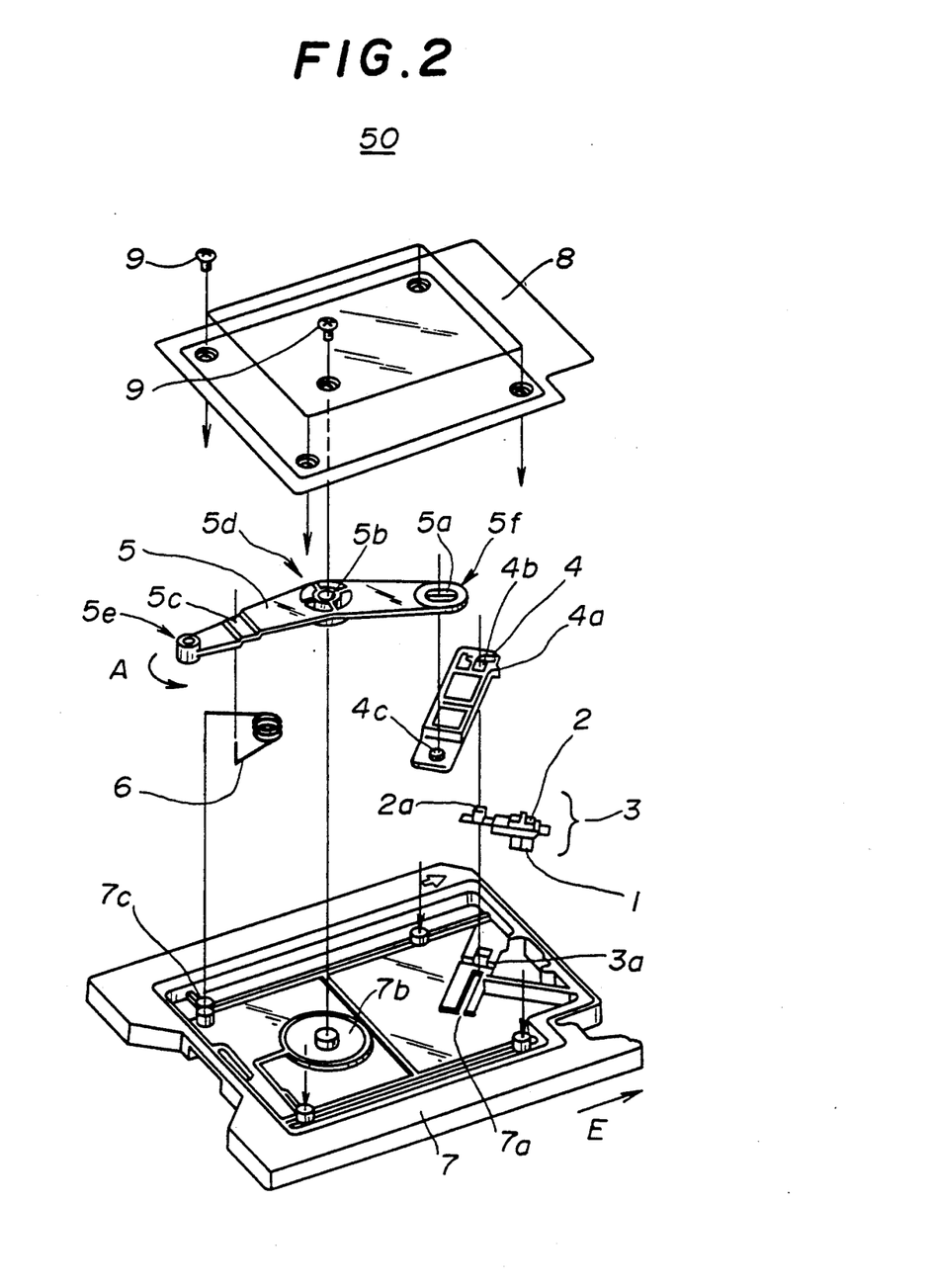
FIG. 2 is an exploded view of an embodiment of a cleaning apparatus of a supporting mechanism for an object lens.

FIG. 2 shows an exploded view of an embodiment of a cleaning apparatus according to the present invention. A cleaning apparatus 50 is inserted into a disk loading portion of an optical disk apparatus and an object lens equipped in the optical apparatus is cleaned off by an operation of a brush provided in the cleaning apparatus 50 via a lever which is manually operated. In the figure, an inserting direction of the cleaning apparatus 50 into the optical disk apparatus is indicated by an arrow E.

The cleaning apparatus 50 has a cleaning unit 3 including a brush 1 and brush holder 2. The cleaning unit 3, a slider 4, driving handle 5, and a spring 6 are accommodated in a space formed by a housing 7 and a top cover 8. The top cover 8 is fixed to the housing 7 by using screws 9.

In FIG. 2, a cylindrical shaft is formed on either end of the brush holder 2, and a prism-shaped protrusion 2a is formed on one of the shafts. A brush 1, for example, made of Nylon is provided to the brush holder 2.

The cleaning unit 3 is supported by a bearing groove 3a formed inside the housing 7 so that the cleaning unit 3 is rotatable with respect to the shaft formed on either end of the brush holder 2. The bearing groove 3a is formed so that the cleaning unit 3 is supported in a direction slanted by an angle of 45 degrees with respect to the inserting direction.

The slider 4 is provided with a protrusion 4a on a side thereof, and an opening 4b into which the above-mentioned protrusion 2a is inserted is formed on one end thereof. Additionally, on the other end of the slider 4, a protrusion 4c is formed which protrusion 4a is engaged with an oblong hold 5a formed on the driving handle 5. further, a protrusion (not shown in the figure) engaging with a guide groove 7a provided on the housing 7 is formed, and with an engagement of the protrusion with the guide groove 7a, the slider 4 can perform a linear motion.

The protrusion 4a and the opening 4b of the slider 4 are respectively engaged with a main body and the prism-shaped protrusion 2a of the brush holder 2, and thereby the cleaning unit 3 rotates while the slider 4 performs a linear motion.

The driving handle 5 includes a center portion 5d which is a center of rotation, an operation end 5e which is manually operated, and a drive end 5f which is driven in response to a movement of the operation end 5e. The center portion 5d, the operation end 5e, and the drive end 5f are respectively provided with an oblong hole 5a, a shaft hole 5b, and a pin hole 5c.

The shaft hole 5b of the center portion 5d is engaged with a cylindrical shaft 7b formed inside the housing 7, and thereby the driving handle 5 is rotatably supported about the shaft hole 5b. The oblong hole 5a on the drive end 5f is engaged with the protrusion 4c of the slider 4, and thereby the slider 4 can perform a linear movement motion while the driving handle 5 rotates. The operation end 5e of the driving handle 5 protrudes from a rear end of the housing 7 so that the operation end 5e can be manually operated.

The spring 6 is engaged with a pin hole 7c formed inside the housing 7 at one end thereof and engaged with the pin hole 5c formed near the operation end 5e on the driving handle 5 at the other end thereof. The spring 6 biases the driving handle 5 so that the operation end 5e rotates in the direction indicated by the arrow A in the figure.

In the above-mentioned construction, the guide groove 7a which enables the slider 4 to perform a linear motion is formed so that the channel direction of the guide groove 7a is perpendicular to the bearing groove 3a which rotatably support the cleaning unit 3. When the slider 4 moves along the guide groove 7a, the protrusion 4a and the opening 4b are respectively engaged with the main body and the protrusion 2a of the brush holder 2, and thereby the cleaning unit 3 rotates with respect to the bearing groove 3a.

Further, when the driving handle 5 rotates about the center portion 5d, the oblong hole 5a formed on the drive end 5f of the driving handle 5 makes engagement with the protrusion 4c of the slider 4, and the slider accordingly performs a linear movement along the guide groove 7a.

Consequently, the slider 4 moves in a direction inclined at 45 degree with respect to the inserting direction indicated by the arrow E while the driving handle 5 rotates, and accordingly the cleaning unit 3 rotates about the bearing groove 3a which is also inclined 45 degree with respect to the inserting direction indicated by the arrow E.

When in operation, the cleaning apparatus 50 is inserted into the optical disk apparatus which is the object for cleaning. In a state where the cleaning apparatus 50 is loaded in a disk loading portion, brush 1 provided in the cleaning apparatus 50 is at a position facing an object lens incorporated in the disk apparatus. Additionally, when the cleaning apparatus is loaded to the disk apparatus, a rear end of the cleaning apparatus 50 protrudes from an opening of the disk apparatus. Consequently, the object lens can be cleaned off by an operator manually operating the operation end of the driving handle 5 which protrudes from the rear end of the cleaning apparatus 50.

Figure 3:
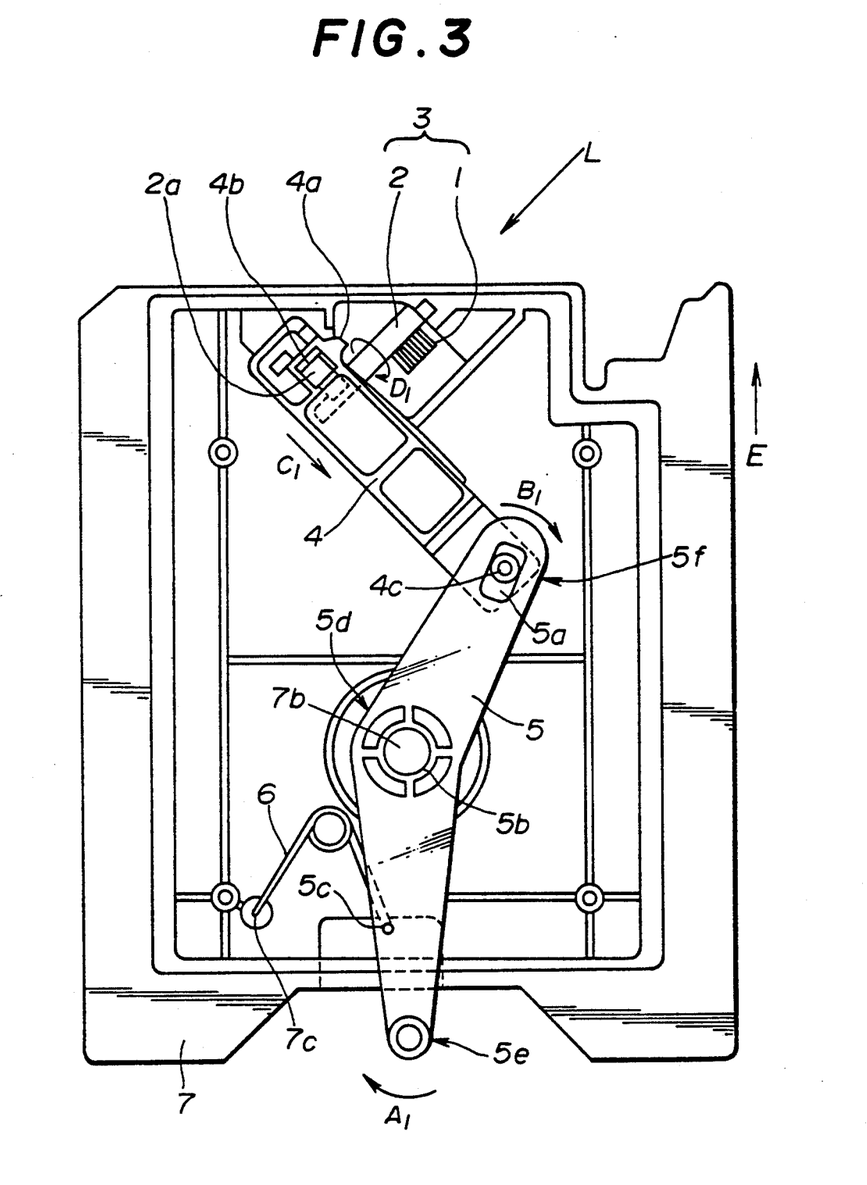
FIG. 3 is a plan view of a cleaning apparatus shown in FIG. 2 in a state where a top cover is removed.
Figure 4:
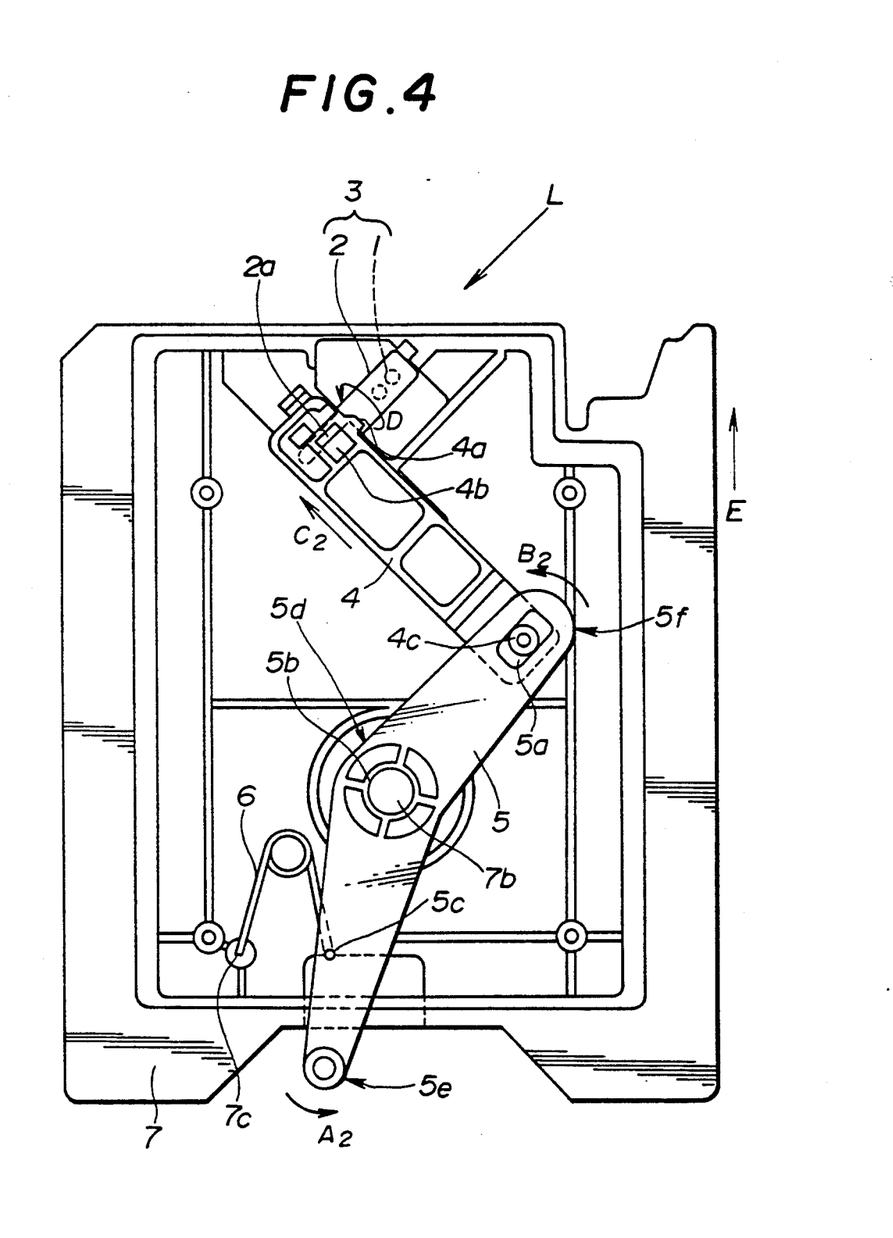
FIG. 4 is a plan view of a cleaning apparatus shown in FIG. 2 in a state where a drive handle is operated.

A description will now be given of an operation of the cleaning apparatus 50. FIG. 3 is a plan view of cleaning apparatus 50 with the top cover removed therefrom, and FIG. 4 is a plan view of the cleaning apparatus 50 as shown in FIG. 3 in a state where the driving handle is operated. In FIGS. 3 and 4, parts that are the same as the parts shown in FIG. 2 are given the same reference numerals from figure to figure, and descriptions thereof will be omitted.

In FIG. 3, an arrow $A_1$ indicates the direction to which the operation end 5e of the driving handle 5 is moved when performing a cleaning operation. An arrow $B_1$ indicates the direction to which the drive end 5f moves while the driving handle 5 rotates in the direction indicated by the arrow $A_1$. An arrow $C_1$ indicates the direction to which the slider 4 linearly moves that is linked with a rotational movement of the driving handle 5. An arrow $D_1$ indicates the direction to which the cleaning unit 3 rotates that is linked with the linear movement of the slider 4.

In the condition shown in FIG. 3, when the operation end 5e is moved, against a restoring force of the spring 6, in the direction indicated by the arrow $A_1$ by applying a force to the operation end 5e of the driving handle 5, the driving handle 5 rotates about the center portion 5d and thereby the drive end 5f opposite to the operation end 5e rotates in the direction indicated by the arrow $B_1$.

This movement of the drive end 5f is communicated to the slider 4, and the slider 4 accordingly performs a linear movement in the direction indicated by the arrow $C_1$, that is the direction inclined 45 degree with respect to the inserting direction indicated by the arrow E. The linear movement of the slider 4 is then communicated to the cleaning unit 3, and the cleaning unit 3 rotates in the direction indicated by the arrow $D_1$. In this manner, when the operation end 5e of the driving handle 5 is moved to the end of the moving range, the components in the cleaning apparatus 50 are positioned as shown in FIG. 4.

In FIG. 4, an arrow $A_2$ indicates the direction to which the operation end 5e of the driving handle 5 is moved when the force applied to the operation end 5e is released. An arrow $B_2$ indicates the direction to which the drive end 5f moves while the driving handle 5 rotates in the direction indicated by the arrow $A_2$. An arrow $C_2$ indicates the direction to which the slider 4 linearly moves that is linked with a rotational movement of the driving handle 5. An arrow $D_2$ indicates the direction to which the cleaning unit 3 rotates that is linked with the linear movement of the slider 4.

In a condition shown in FIG. 4, when the force applied to the operation end 5e of the driving handle is released, the operation end 5e rotates in the direction indicated by the arrow $A_2$ due to by the restoring force of the spring 6. Since the driving handle 5 rotates about the center portion 5d, the drive end 5f opposite to the operation end rotates in the direction indicated by the arrow $B_2$.

The movement of the drive end 5f is communicated to the slider 4, and the slider thereby performs a linear movement in the direction indicated by the arrow $C_2$, that is the direction inclined 45 degree with respect to the inserting direction indicated by the arrow E. The movement of the slider 4 is then communicated to the cleaning unit 3, and the cleaning unit rotates in the direction indicated by the arrow $D_2$. In this manner, each component in the cleaning apparatus 50 returns to the position shown in FIG. 3.

FIGS. 5A to 5F show a detailed cleaning operation of the cleaning apparatus 50. FIGS. 5A to 5D show a process between the conditions shown in FIG. 3 and the condition shown in FIG. 4, and FIGS. 5D to 5F show a returning process between the condition shown in FIG. 4 and the condition shown in FIG. 3. These figures are views taken from a direction indicated by an arrow L in FIGS. 3 and 4. In FIGS. 5A to 5D, parts that are the same as the parts shown in FIG. 2 are given the same reference numerals from figure to figure, and the descriptions thereof will be omitted. It should be noted that reference numerals 10 and 11, in the figures, respectively indicate an object lens and a lens holder in an optical disk apparatus.

Figure 5A:
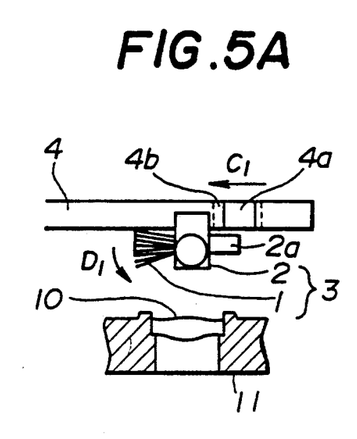
FIGS. 5A-5F are illustrations for explaining a cleaning operation.

FIG. 5A shows a state where no operational force is applied to the operation end 5f of the driving handle 5, that is the condition shown in FIG. 3. In this condition, the slider 4 is positioned at the utmost right end of the movable range in the figure, and the slider 4 cannot move to the right in the figure any more. The protrusion 2a of the brush holder 2 is positioned in a condition where the protrusion 2a is parallel to the slider 4.

When the operation end 5e of the driving handle 5 is manually moved in the direction indicated by the arrow $A_1$, the slider 4 in FIG. 5A moves in a direction indicated by the arrow $C_1$. By the movement of the slider 4, the protrusion 4a comes in contact with the main body of the brush holder 2 at a position away from the center of rotation and presses that position, and the brush holder 2 accordingly rotates in the direction indicated by the arrow $D_1$. With the rotation of the brush holder 2, the protrusion 2a enters into the opening 4b of the slider 4 as shown in FIG. 5B.

Figure 5B:
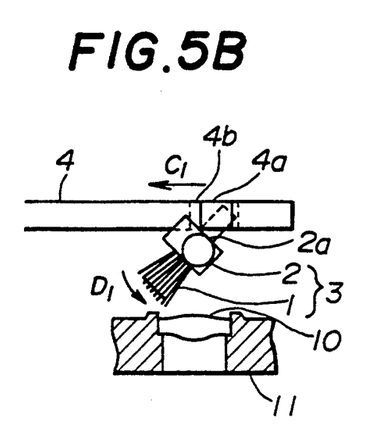
Figure 5C:
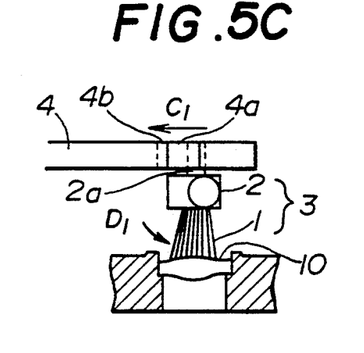

When the operation end 5e is moved further in the direction indicated by the arrow $A_1$ in FIG. 3 from the condition shown in FIG. 5B, the slider 4 moves further in the direction indicated by the arrow $C_1$. The protrusion 2a then comes in contact with the right wall of the opening 4b and is pressed by the wall, and the brush holder 2 is accordingly rotated in the direction indicated by the arrow $D_1$ to result in the condition shown in FIG. 5C. In this condition, the brush 1 which has rotated together with the brush holder 2 comes in contact with the object lens 10.

Figure 5D:
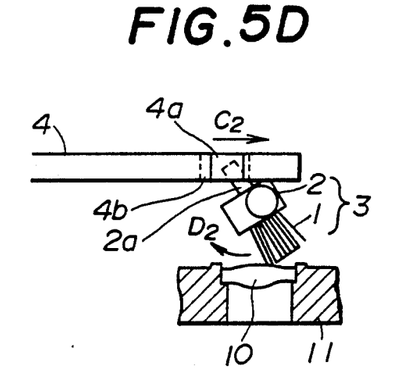

When the operation end 5e is moved further in the direction indicated by the arrow $A_1$ in FIG. 3, the slider 4 moves further in the direction indicated by the arrow $C_1$. The protrusion is then further pushed by the right wall of the opening 4b, and the brush holder is rotated further in the direction indicated by the arrow $D_1$. Consequently, the brush 1 slides on a surface of the object lens 10 while sweeping the surface, and dirt on the surface of the object lens 10 is thereby removed. Then the brush is positioned in the condition as shown in FIG. 5D. In this condition, the slider 4 is positioned at the utmost left side of the movable range in the figure, and thus the slider 4 is no longer moved to the left.

Figure 5E:
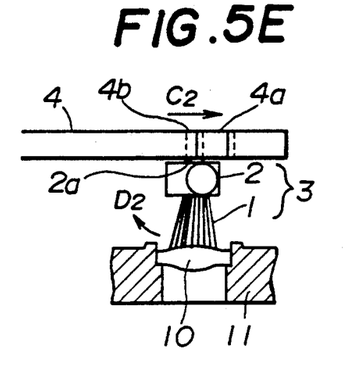
Figure 5F:
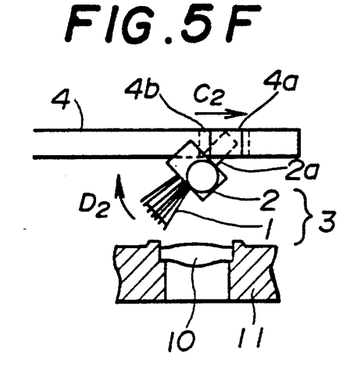

When the operational force applied to the operation end 5e is released in the condition shown in FIG. 5D, the operation end 5e is moved, by the restoring force of the spring 6, in the direction indicated by the arrow $A_2$, and the slider thereby moves in the direction indicated by the arrow $C_2$. Then the protrusion 2a is pressed by the left wall of the opening 4b, and the brush holder 2 thereby rotates in a direction indicated by the arrow $D_2$. Then the brush holder 2 is positioned in the condition as shown in FIG. 5E. At this time, the brush 1 which has rotated together with the brush holder 2 comes in contact with the object lens 10.

When the slider 4 moves further in the direction indicated by the arrow $C_2$, the protrusion 2a is pushed by the left wall of the opening 4b and thus the brush holder 2 is rotated in the direction indicated by the arrow $D_2$. Accordingly, the brush 1 slides on the surface of the object lens 10 while sweeping from right to left in the figure. As a result, dirt on the surface of the object lens is removed, and then the cleaning unit 3 returns to the condition shown in FIG. 5A via the condition shown in FIG. 5F.

As mentioned above, in the cleaning apparatus according to the present invention, dirt on the surface of the object lens 10 is cleaned off by a manual operation of the operation end 5e which protrudes from the rear end of the cleaning apparatus after inserting the cleaning apparatus into the optical disk apparatus. The operational force applied to the operation end 5e is communicated to the cleaning unit 3 via the slider 4. The sliding direction of the cleaning unit 3 is inclined 45 degree with respect to the inserting direction indicated by the arrow E of the cleaning apparatus.

In general optical disk apparatus, the tracking direction of an object lens corresponds to the inserting direction E of the disk. Thus, by inclining the sliding direction of the brush 1 with respect to the inserting direction E, forces exerted to a movable direction of the object lens and a direction perpendicular in a movable direction of the object lens are determined as components of the sliding force.

That is, magnitude of component forces of the sliding force F in the movable direction of the object lens and the direction perpendicular to the moving direction of the object lens are respectively represented as $F \cos \theta$ and $F \sin \theta$, where F is the sliding force exerted on the object lens by the brush and $\theta$ is an angle formed between the direction of the sliding force F and the movable direction of the object lens. It is natural that the component forces exerted in the movable direction of the object lens and the direction perpendicular to the movable direction of the object lens are smaller than the sliding force F.

Accordingly, by constituting the sliding direction of the brush 1 to be at 45 degree inclined with respect to the inserting direction E of the cleaning apparatus 50 as in the present embodiment, forces exerted to the movable direction of the object lens and the direction perpendicular in the movable direction are respectively 0.7 times the sliding force exerted by the brush 1. This condition is considered to be most effective when reducing the component forces in the above-mentioned two directions simultaneously.

According to the construction mentioned above, the movement of the object lens due to the sliding force of the brush is suppressed. Additionally, a load to suspension wires which extend perpendicular to the movable direction of the object lens is reduced, or collection of dust swept into the bearing portion can be prevented. Therefore, efficiency of the cleaning of the object lens is improved, and malfunction and damage of the guiding mechanism or the supporting mechanism of the object lens can be prevented.

It should be noted that although the cleaning mechanism is manually operated in the present emodiment, the cleaning mechanism may be operated automatically by using a motor. Additionally a pad having an adhesion function may be used as cleaning means. The angle between the sliding direction of the brush and the inserting direction of the cleaning apparatus may be determined to an appropriate angle depending upon characteristics of the supporting mechanism of the object lens and desired cleaning effect.

The present invention is not limited to the specifically disclosed embodiments, and variations and modifications may be made without departing from the scope of the present invention.

What is claimed is:

1. A cleaning apparatus for an object lens incorporated in an optical disk apparatus which is used with a cartridge type optical disk, the cleaning apparatus performing a cleaning operation while inserted into a disk loading portion of the optical disk apparatus, the cleaning apparatus comprising:

a housing having approximately the same shape with said cartridge type optical disk, said housing having a first surface parallel to a recording surface of the optical disk when the optical disk is loaded to said disk loading portion of the optical disk apparatus, said first surface facing said object lens when said cleaning apparatus is inserted into said optical disk apparatus;

cleaning means, provided in said housing, for cleaning said object lens, wherein said cleaning means protrudes from said first surface during operation when said cleaning apparatus is inserted into said optical disk apparatus, the cleaning operation being performed by said cleaning means making contact with said object lens and sliding on said object lens; and driving means, provided in said housing, for driving said cleaning means so that a sliding direction of said cleaning means becomes a predetermined direction between an inserting direction of said cleaning apparatus into said optical disk apparatus and a direction perpendicular to said inserting direction, said inserting direction and said direction perpendicular to said inserting direction being parallel to said first surface of said housing.

2. The cleaning apparatus as claimed in claim 1, wherein an angle between said predetermined direction of said sliding direction of said cleaning means and said inserting direction of said cleaning apparatus is approximately 45 degrees.

3. The cleaning apparatus as claimed in claim 1, wherein said cleaning means comprises a cleaning member making contact with said object lens and sliding on said object lens and a holder on which said cleaning member is fixed, said holder being rotatable between a first position and a second position and supported with respect to an axis parallel to said first surface of said housing and perpendicular to said predetermined direction, said cleaning member being accommodated inside said housing when said holder is at said first position and protruding from said first surface of said housing when said holder is at said second position, said cleaning member sliding on said object lens when said holder reciprocally rotates around said second position.

4. The cleaning apparatus as claimed in claim 3, wherein said driving means includes a slide plate having a first protrusion which protrudes in a direction perpendicular to said predetermined direction and moving along said predetermined direction, said slide plate being at a third position when said holder is at said first position and being at a fourth position when said holder is at said second position, said first protrusion making engagement with a portion of said holder a predetermined distance radially away from the center of rotation of said holder while said slide plate moves from said third position to said fourth position, said holder being rotated from said first position toward said second position by being pushed by said first protrusion.

5. The cleaning apparatus as claimed in claim 4, wherein said holder includes a second protrusion which protrudes in a radial direction of the rotation of said holder and said slide plate includes a hole having an inner wall approximately perpendicular to said first surface of said housing, said second protrusion entering into said hole and making engagement with said inner wall of said hole while said slide plate moves from said third position to said fourth position, said holder being rotated toward said second position by said second protrusion being pushed by said inner wall due to continuing movement of said slide plate.

6. The cleaning apparatus as claimed in claim 5, wherein said driving means includes a lever having one end being engaged with said slide plate and the other end protruding from said housing, said lever being supported about the center thereof so that said lever can be rotated parallel to said first surface of said housing between a fifth position and a sixth position, said slide plate being at said third position when said lever is at said fifth position and being at said fourth position when said lever is at said sixth position.

7. The cleaning apparatus as claimed in claim 6, wherein said other end of said lever protrudes from a rear end of said housing with respect to the inserting direction of said cleaning apparatus.

8. The cleaning apparatus as claimed in claim 6, wherein said driving means further includes a biasing means for biasing at least one of said holder, said slide plate and said lever so that said holder is maintained to be at said first position.

9. The cleaning apparatus as claimed in claim 8, wherein said biasing means comprises a torsion coil spring, and one end of said torsion coil spring is engaged with said housing and the other end of said torsion coil spring is engaged with said lever so that said torsion coil spring biases said lever to be at said fifth position.

10. The cleaning apparatus as claimed in claim 3, wherein said cleaning member comprises a brush.

11. The cleaning apparatus as claimed in claim 3, wherein said cleaning member comprises a pad to which dust is adhered.

* * * * *